US005402027A

United States Patent [19]

Strobl

[11] Patent Number: 5,402,027

[45] Date of Patent: Mar. 28, 1995

[54] BRUSH ASSEMBLY FOR AN ELECTRIC MOTOR

[75] Inventor: Georg Strobl, Stuttgart, Germany

[73] Assignee: Johnson Electric S.A., La Chaux de Fonds, Switzerland

[21] Appl. No.: 172,607

[22] Filed: Dec. 22, 1993

[30] Foreign Application Priority Data

Dec. 22, 1992 [GB] United Kingdom ................. 9226648

[51] Int. Cl.$^6$ ............................................. H02K 13/00

[52] U.S. Cl. ...................................... 310/239; 310/71; 310/242; 310/245; 310/248

[58] Field of Search ............... 310/239, 240, 292, 245, 310/246, 247, 248, 249, 71

[56] References Cited

U.S. PATENT DOCUMENTS

| | | | |
|---|---|---|---|
| 1,933,628 | 11/1933 | Kitto | 310/239 |
| 2,548,631 | 4/1951 | Stapleton | 310/239 |
| 3,681,635 | 8/1972 | Bayer | 310/248 |
| 4,329,612 | 5/1982 | Averill | 310/247 |
| 4,359,656 | 11/1982 | Fasterding | 310/239 |
| 4,567,414 | 1/1986 | Berings | 310/240 |

FOREIGN PATENT DOCUMENTS

| | | | |
|---|---|---|---|
| 0234427 | 9/1987 | European Pat. Off. . | |
| 0545061 | 8/1922 | France | 310/239 |
| 1169209 | 12/1958 | France | 310/247 |
| 705948 | 5/1941 | Germany . | |
| 7107035 | 8/1972 | Germany . | |
| 5-38099 | 2/1993 | Japan | 310/248 |
| 261610 | 11/1926 | United Kingdom . | |
| 280808 | 11/1927 | United Kingdom . | |
| 0264673 | 8/1928 | United Kingdom | 310/239 |
| 0345523 | 3/1931 | United Kingdom . | |
| 831333 | 3/1960 | United Kingdom . | |
| 1028794 | 5/1966 | United Kingdom . | |
| 1532588 | 11/1978 | United Kingdom . | |
| 2095919 | 10/1982 | United Kingdom . | |
| 551740 | 6/1977 | U.S.S.R. . | |

OTHER PUBLICATIONS

English translation of European Patent Application 234 427, of Feb. 9, 1987.

*Primary Examiner*—R. Skudy

*Attorney, Agent, or Firm*—Ostrolenk, Faber, Gerb & Soffen

[57] ABSTRACT

A brush assembly for an electric motor has a brush 20, a brush terminal 30 and a brush spring 40. The brush spring is fashioned from an elongate strip 41 of resilient, electrically conductive material and is fixed to the brush terminal at its ends to form a loop with an intermediate portion fixed to the brush to electrically connect the brush to the brush terminal and to urge the brush into contact with a commutator of the motor. Brush guiding arrangements for guiding the brush to the commutator has a guide pin 51 fixed at one end 52 to the brush terminal and co-operating with a guide hole 21 formed in the brush to define the position of the brush on the commutator 11.

22 Claims, 3 Drawing Sheets

BRUSH ASSEMBLY FOR AN ELECTRIC MOTOR

FIELD OF THE INVENTION

This invention relates to a brush assembly for an electric motor and in particular to an assembly providing a stable brush position for a short brush with expected low wear, as, for example, in a motor with a carbon commutator in a low voltage application.

BACKGROUND ART

Known brush assemblies are generally of two main types, either brushes mounted on leaf arms or guided brushes such as caged brushes. Leaf brushes are simple in construction but guided brushes are preferred when electrical noise is of concern. One source of electrical noise is the sideways floating and bouncing of the brush as it encounters irregularities in the brush path of a commutator or slipring. Leaf brushes continually change their position on the commutator surface. This is minimized by using a guided brush assembly.

Known guided brush assemblies for an electric motor having a commutator comprise a brush for sliding contact with the commutator, a brush terminal, a brush spring for urging the brush into contact with the commutator, and brush guiding means for guiding the brush towards the commutator.

Generally, the brush guiding means is a cage surrounding the brush on four sides and in which the brush is received to form a loose sliding fit. The cage has an open end adjacent the commutator and the brush spring pushes the brush away from the opposite end. A brush tail or shunt is required to electrically connect the brush to the brush terminal as neither the spring nor the cage makes satisfactory electrical contact with the brush, especially in a low voltage application.

Brushes for caged brush assemblies are usually long brushes. They are used in situations where substantial wear on the brush is expected over the life of the motor and the spring is long to provide a constant spring tension over the range of expected wear. The brush shunt is connected to the brush by being embedded into the end of the brush remote from the commutator (the non-working end). At the end of the brush life the shunt should not be exposed as contact with the commutator by the shunt may lead to damage of the commutator surface. This connection requires a significant portion of the brush. This is generally tolerated as the cage itself requires a minimum length of brush (dead length) to ensure avoidance of misalignment of the brush in the cage which could result in the brush becoming jammed and thus, not providing satisfactory contact with the commutator. As will be realized, such an arrangement requires an assembly of considerable size.

Therefore, in low noise, low wear situations, a caged brush assembly requires a brush length of excessive size compared with the expected wear. The normal leaf brush arrangement is not suitable for low noise situations because of the requirement to make the brush arm as long as possible to provide a constant spring force. Although this arrangement can satisfactorily handle short brushes, it is inherently unstable resulting in a significant amount of noise.

GB0345523A describes a guide brush assembly in which the brush is urged towards the commutator by a coil spring located around a pin connecting the brush to the frame of the brush assembly. A bent plate spring is provided on the sides of the brush to prevent movement of the brushes circumferentially around the surface of the commutator. The construction is complicated requiring a coil spring, a brush with an embedded shunt, a pin fixed to the end of the brush, a brush assembly frame and a separate brush terminal.

Thus, there is a need for a brush assembly which can handle short brushes for use in low wear situations and provide a stable or moderately stable brush position.

SUMMARY OF THE INVENTION

The purpose of the invention is to at least reduce the disadvantages of known brush assemblies and, in particular, to provide brush assemblies which provide stable or relatively stable brush positions.

This is achieved by providing a brush assembly with a brush guiding means comprising a guide pin cooperating with a hole for guiding the brush towards the commutator or slipring.

Thus, the present invention provides a brush assembly comprising; a brush; a brush terminal; a spring for urging the brush into contact with the commutator and electrically connecting the brush to the brush terminal; and brush guiding means including a guide pin cooperating with a guide hole for guiding the brush to the commutator.

Preferably, means are provided to prevent rotation of the brush about the guide pin. This may be most conveniently provided by the spring.

Preferably, the spring is a brush leaf formed from a strip of resilient, electrically conductive material having two ends fixed to the brush terminal and an intermediate portion to which the brush is attached, the spring thus being formed as a loop.

The looped leaf spring provides a relatively stable brush position compared with normal or floating leaf brush assemblies by "fixing" the "free" end of the leaf. By fixing both ends to a common point, the brush terminal, construction is simplified by allowing the assembly to be completed before mounting to the end cap or brush holder of the motor. By precise mounting of the brush terminal, the brush assembly is precisely located.

It is convenient for the looped brush leaf to be formed with a permanent set, ideally set so that each half of the leaf forms a "U" although other arrangements including V-shaped halves or non-set leaves are envisaged.

If the motor is to be driven in both directions there may be an advantage in having the leaf symmetrical about a transverse plane whereas for single direction, motors, one half of the leaf may be stronger or shorter than the other half to provide an uneven bias on the brush to affect the operating characteristics of the motor or to counter the drag effect on the brush by the commutator, etc.

The spring need not be looped as the guide will maintain the orientation and position of the brush. The spring may be a leaf type spring and may resemble half of the looped leaf as described above, with or without a permanent set. The spring thus acts on the brush to urge the brush axially of the guide pin. However, the looped brush leaf is preferred as in that embodiment, in use, the forces on the guide pin are substantially transverse created by drag between the commutator and the brush.

Preferably, the guide hole is formed in the brush and one end of the guide pin is rigidly attached to the brush terminal, the pin being received in the guide hole to form a sliding fit within the guide hole.

A clearance is preferably provided in the brush in the region in which, in use, the free end of the guide pin is located. This clearance avoids contact between the end of the guide pin and the inside surface of the guide hole which otherwise may lead to chaffing of the guide hole. This clearance may be in the form of a counter bore in the guide hole or even a channel formed across the base of the brush.

Such a channel, if so formed, has the added advantage of providing a convenient method of lifting the brush for insertion of the commutator. It also provides a quick visual indication of wear. It may provide an increase in the cross-resistance of the brush which has certain advantages in brush construction theory by providing first and second circumferentially spaced commutator contact portions.

Cross-resistance is the electrical resistance of the brush measured between one commutator contact face to another or from the leading edge to the trailing edge of the contact surface of the brush. Through-brush resistance is the electrical resistance of the brush measured between the contact surface and the brush connector (leaf spring or shunt), i.e., the resistance of the current path through the brush. Unfortunately, maximum commutation usually occurs at the point where the brush substantially equally straddles two commutator segments leading to large short circuit currents across the brush. By increasing the cross-resistance of the brush, it is possible to reduce this shorting effect and consequential sparking which occurs as the brush transfers from one segment to the next. However, while trying to increase the cross-resistance, it is important to maintain the through-resistance as low as possible as this effects the power of the motor.

Where the brush is to be used in a single direction motor, the first contact portion may have a greater cross-sectional area than the second contact portion to increase the cross-section further.

Thus, this construction allows the cross-resistance of the brush to be increased simply without the use of sections of different materials.

By forming the base of the brush in the shape of a V, the brush will have two lines of contact with the commutator. If the shape of the V is chosen so that the lines of contact are between the outer edge of the brush and midway along the arm of the V, a stable brush contact is formed because of the wide base. However, if the lines of contact are closer to the mid-point of the arms, the leading edges of the brush do not need to be chamfered to avoid chaffing on the edges of the commutator segments.

The guide pin may be hollow. This allows the guide pin to be used for additional functions such as providing a path for brush/commutator lubricants or supporting an optical fiber close to the commutator surface, etc. An optical fiber so supported may be used to count segments in a multi-segment motor in conjunction with a position monitor or used with an infra-red temperature detector to monitor the temperature of the commutator surface.

Preferably, the brush leaf has a slot or series of holes formed in the strip between an end fixed to the brush terminal and where the brush is mounted. The slot may be a blind slot or an open slot i.e. dividing the end into two. For the looped brush leaf, slots may be formed in both halves of the leaf. The slots are used to reduce spring tension and to relieve any internal tension within the brush spring caused when forming or mounting the leaf, which may otherwise lead to twisting of the brush. However, the cross-sectional area of the brush leaf must be sufficient to carry the expected maximum current of the motor carded by the brush.

The leaf may be formed with a finger which is releasably engageable with the brush terminal to hold the brush in a retracted position. This allows the brush to be held retracted while the motor is being assembled, at least while the rotor is being fitted to the end cap so that the brushes will be held clear of the commutator and then released to engage the commutator. This avoids the need for other brush lifting techniques. The finger could be formed from the material of the brush leaf removed to form one or both slots or to form the hole through which the brush is fitted to the leaf. Two or more fingers could be provided although it is envisaged that one would be sufficient.

Preferred brush assemblies according to the invention, will now be described, by way of example only, with reference to the accompanying drawings.

DETAILED DESCRIPTION

Figure 1:
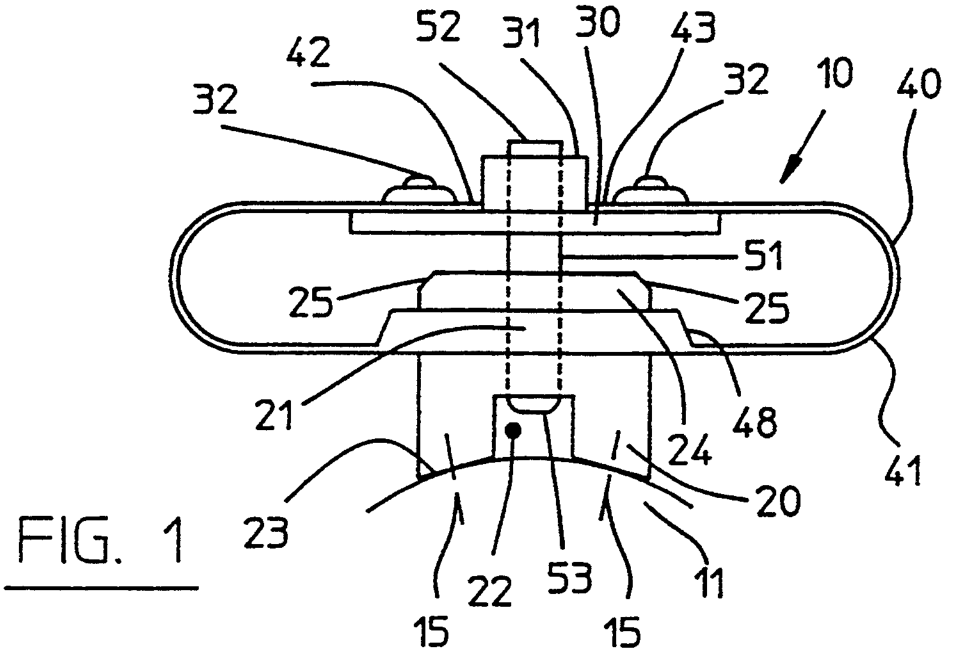
FIG. 1 is a diagrammatic representation of a brush assembly according to the invention.
Figure 2:
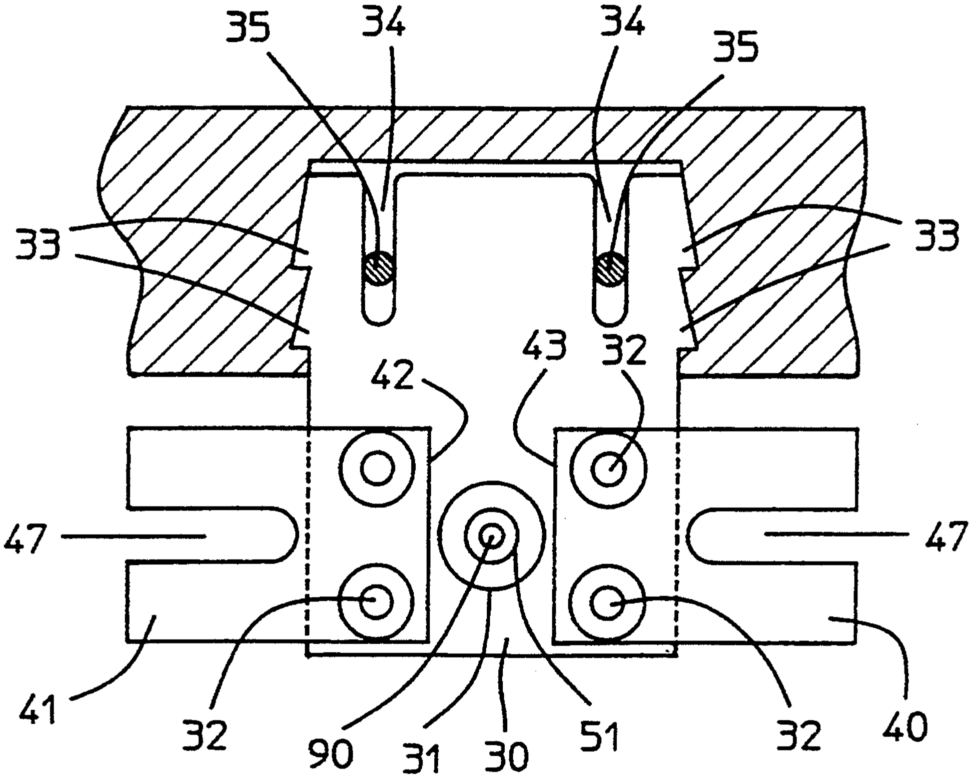
FIG. 2 is a plan view of the brush assembly of FIG. 1 fitted to an end cap shown in section.

As shown in FIGS. 1 and 2, the preferred brush assembly 10 has a brush 20, arranged to be in sliding contact with a commutator (or slipring) 11, a generally plate-like brush terminal 30, and a spring 40 which not only urges the brush 20 into contact with the commutator 11 but also electrically connects the brush 20 with the brush terminal 30.

Brush guiding means comprises a guide pin 51 having a fixed end 52, pressed into a boss 31 formed on the brush terminal 30, and a free end 53. The guide pin 51 cooperates with a guide hole 21 formed in the brush 20 to guide the brush 20 towards the commutator 11. The guide pin 51 creates a sliding fit in the guide hole 21 to securely and accurately locate the brush 20 in the desired position on the commutator.

The guide pin 51 may be hollow. In FIG. 2, the guide pin 51 is shown with an axially extending through hole 90. This hole 90 may have many uses as it provides a stable position close to the commutator surface without the risk of electrically fouling the brushes or the commutator. Such uses may include providing a path for commutator lubricant used to provide lubrication between the commutator 11 and the brush 20. This is possible due to the closeness of the end of the guide pin 51 to the commutator surface. An alternative use is to provide a means for mounting an optic fiber close to the surface of the commutator which can then be used, with suitable control circuitry to monitor the angular position of the rotor, the speed of rotation of the rotor, the number of revolutions of the rotor and/or the temperature of the surface of the commutator.

A channel 22 is formed across the base 23 of the brush 20 to provide a path for a lifting finger used during assembly of the motor to lift the brush 20 to clear the commutator 11 as the end cap is fitted to the rotor. The channel 22 also provides a visual wear indicator. In use, the free end 53 of the pin 51 would be located in this channel 22 to avoid chaffing the inside of the guide hole 21.

The base 23 of the brush 20 is V-shaped with the point W apex of the V coinciding with the channel 22. This arrangement provides a stable brush contact by providing two spaced apart lines of contact 15 between the brush 20 and the commutator 11, which quickly wearin to provide two areas of contact.

Figure 4:
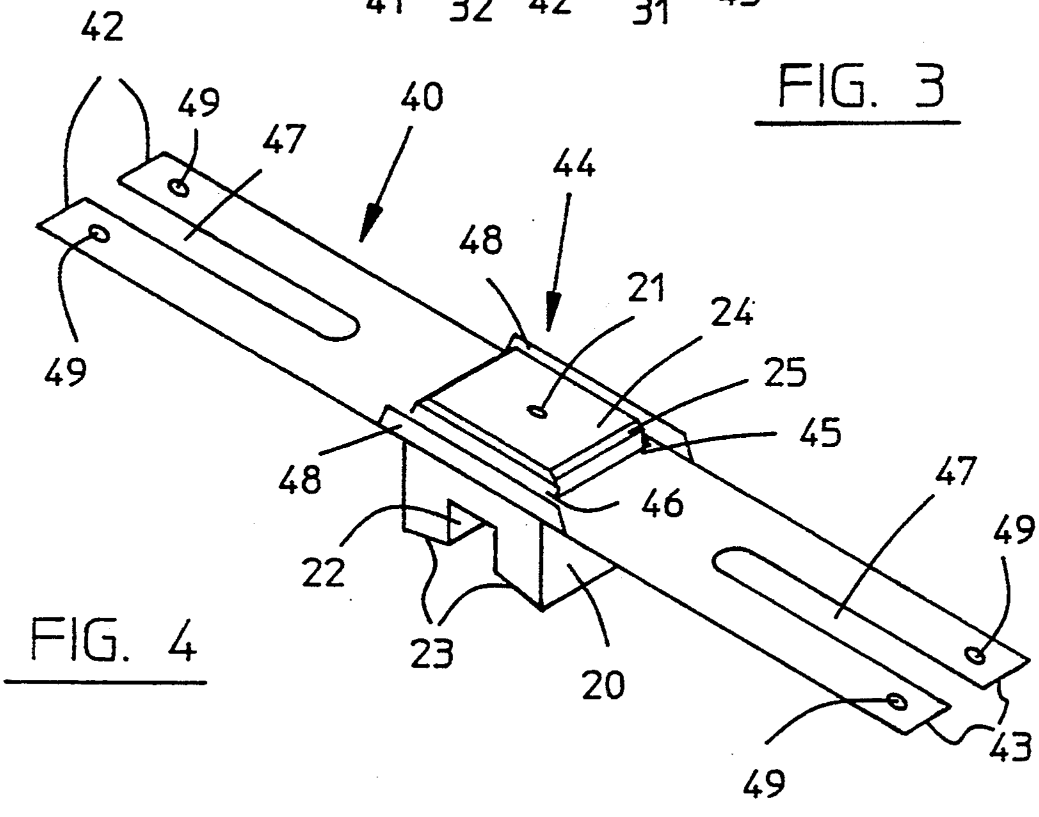
FIG. 4 is a perspective view of an unmounted spring complete with brush.

The top of the brush is provided with a single castellation 24 which passes through a brush mounting hole 45 to fix the brush to the brush 20 spring 40 as more clearly shown in FIG. 4. Bevels 25 help ease the brush 20 through the hole 45.

Figure 3:
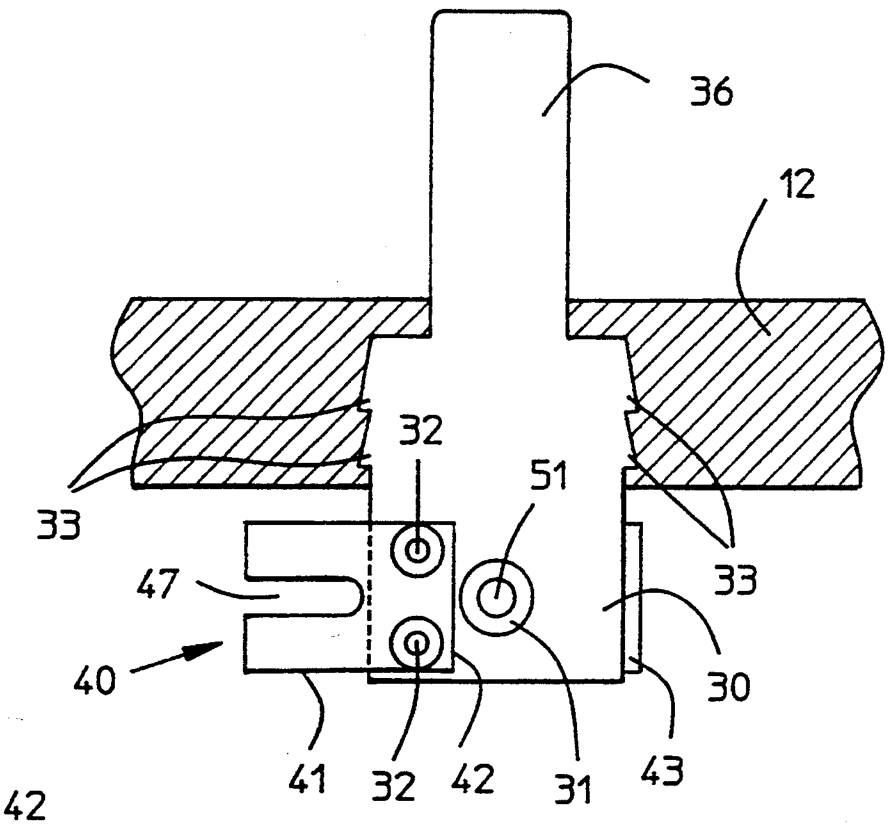
FIG. 3 is a view similar to FIG. 2 of a modified brush assembly.

The spring 40 is a brush leaf fashioned from an elongate strip 41 of resilient electrically conductive material such as beryllium copper. The spring may be double sided, i.e. formed in a loop with both ends 42, 43 connected to the brush terminal as shown in FIGS. 1 and 2, or single sided as shown in FIG. 3 with only one end 42 connected to the brush terminal and the other end 43 left free.

The fixed ends are provided with holes 49 for fixing the spring 40 to the brush terminal 30 by riveting. The brush mounting hole 45 is formed in an intermediate portion 44 as seen in FIG. 4. The edges of the hole form resilient tabs 46 which grip the castellation 24 of the brush 20 as it is pushed into the hole 45 to make electrical contact and to hinder its withdrawal.

Ribs 48 are formed along the edges of the strip adjacent the mounting hole 45 to strengthen and stiffen this region which is otherwise considerably weakened by the provision of the mounting hole 45.

The spring of FIG. 2 is slotted on both sides between the brush mounting hole 45 shown in FIG. 4 and the ends 42, 43. The slots 47 release any internal tension which may otherwise cause twisting of the spring 40 resulting in twisting of the brush 20. The slots 47 also allow the spring tension to be varied and the size of the slots may be chosen to vary the spring tension as required for a particular application. However, the cross-sectional area of the leaf must be sufficient to carry the expected maximum current to be carried by the brush 20.

The slots may be blind as in FIGS. 2 and 3 or may be open as in FIG. 4 resulting in bifurcated ends 42, 43. The single sided spring of FIG. 3 has a single slot 47 between the brush mounting hole 45 shown in FIG. 4 and the terminal end 42.

The brush terminal 30 is plate-like with a boss 31 for receiving the fixed end 52 of the guide bin 51. The terminal 30 also has studs 32 for riveting the spring 40 to the terminal 30.

In the embodiment shown in FIG. 2, the terminal 30 extends into and is captured by the end cap 12 of the motor. Barbs 33 cooperate with the end cap 12 to help prevent removal of the terminal 30. Wire connecting slots 34 are provided in that end of the terminal 30 which is inserted into the end cap 12 to engage and make electrical contact with wires 35 in the end cap 12. These wires may be for connecting the brush terminal 30 to a motor terminal (either internal or external) or may be lead wires for other motor components such as a choke, capacitor or heat sensitive switch.

FIG. 3 illustrates an alternative terminal arrangement in which the brush terminal 30 extends right through the end cap 12 to form an external motor terminal 36.

Any flexibility in the connection between the brush terminal and the end cap will be reflected in the stability of the brush position.

Figure 5:
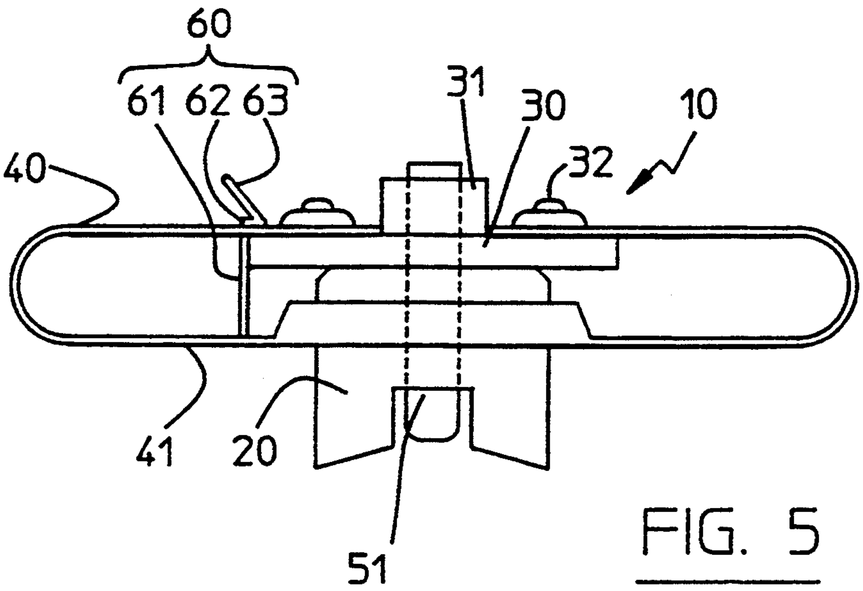
FIG. 5 is a view similar to FIG. 1 illustrating a brush latching mechanism.

FIG. 5 illustrates a brush assembly similar to the assembly of FIG. 1. This assembly 10 has the additional feature of a brush latching mechanism 60. The latching mechanism 60 comprises a finger 61 formed on the spring 40. The finger is formed from the material cut from the strip 41 to form one of the slots 47 shown in FIGS. 2–5.

The finger 61 has a distal end arranged to engage the brush terminal 30 when the spring 40 is fully compressed by a pressing the brush 20 against the brush terminal 30. As shown in FIG. 5, the distal end has a step 62 which latches onto the upper surface of the brush terminal 30 or onto the end of the spring 40 itself where the ends of the spring 40 are not divided to hold the spring 40 and thereby hold the brush in the retracted position.

The step 62 is preceded by a ramp or sloping portion 63 which cooperates with the brush terminal 30 to move the finger to the left as the brush terminal contacts the finger until the step 63 clears the terminal 30 at which time it resiliently returns to the right to latch the brush assembly into the retracted position. The brush assembly is unlatched by moving the finger 61 to the left until the step is clear of the brush terminal 30 allowing the spring 41 to urge the brush away from the brush terminal 30.

Holes, not shown, may be provided in the end cap 12 to provide access for a rod or tool to move the finger to unlatch the brush assembly. The finger may remain in readiness to latch the assembly again should the brush be fully retracted for example, during maintenance or the unlatching action may be sufficient to cause a permanent deformation of the finger 61 so that the latching mechanism is no longer functional and the finger 61 does not rub on the terminal.

Figure 6:
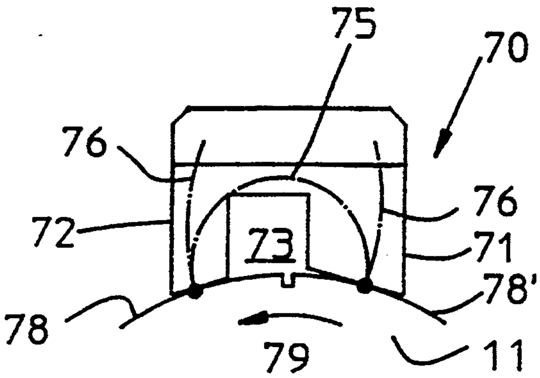
FIG. 6 is an illustrative representation of a modified brush for use with a brush assembly according to the invention.

In FIG. 6, a modified brush 70 is shown in side view. The construction of this brush 70 increases the cross-resistance of the brush 70 without significantly increasing the through resistance. This is achieved by dividing the commutator contact end of the brush 70 into a first commutator contact portion 71 and a second commutator contact portion 72 by a channel 73. The channel 73 runs parallel to the longitudinal axis of the commutator 11 so that the first portion 71 and the second portion 72 contact the commutator 11 at circumferentially spaced locations. By this construction, the cross-brush current follows current path 75 which is almost twice as long as the normal current path 76 although, in practice, paths of the same length would be expected. This is a significant increase in the cross-resistance.

For motors which rotate in one direction only e.g. in the direction of arrow 79, the first portion 71 may be of greater cross-sectional area than the second portion 72 as illustrated to increase the cross-resistance of the brush even further. Thus, as the brush 70 moves from contact with commutator segment 78 into contact with segment 78′, motor current is fed to segment 78′ and the shorting resistance between segments 78 and 78′ becomes important.

I claim:

1. A brush assembly for an electric motor having a commutator, the assembly comprising:
   a brush;
   a brush terminal;
   a spring for urging the brush into contact with the commutator and electrically connecting the brush to the terminal; and
   brush guiding means including a guide pin cooperating with a guide hole for guiding the brush to the commutator.

2. A brush assembly according to claim 1, wherein the guide hole is formed in the brush and the guide pin has a first end fixed in a boss formed on the brush terminal, and a free second end, the guide pin being received to form a sliding fit within the guide hole.

3. A brush assembly according to claim 2, wherein a clearance is formed in the brush in a region in which the free second end of the guide pin is located during use.

4. A brush assembly according to claim 1, further comprising means to prevent rotation of the brush about the guide pin.

5. A brush assembly according to claim 1, wherein the spring is a brush leaf formed from a strip of resilient, electrically conductive material having two ends and an intermediate portion, the two ends being fixed to the brush terminal to form a loop and the intermediate portion being fixed to the brush.

6. A brush assembly according to claim 5, wherein the brush leaf has two slots respectively formed between the intermediate portion and the two ends.

7. A brush assembly according to claim 6, wherein the slots extend to the two ends to form bifurcated ends.

8. A brush assembly according to claim 5, wherein the brush leaf is symmetrical.

9. A brush assembly according to claim 5, wherein the spring has a finger which is releasably engageable with the brush terminal to hold the brush in a retracted position.

10. A brush assembly according to claim 2, wherein the guide pin is hollow.

11. A brush assembly according to claim 1, wherein the brush has a V-shaped base providing two lines of contact between the base of the brush and the commutator.

12. A brush assembly according to claim 1, wherein the brush is constructed from a single composition and divided into a first commutator contact portion and a second commutator contact portion by a channel such that the first and second contact portions, in use, contact the commutator at circumferentially spaced locations.

13. A brush assembly according to claim 12, wherein the first commutator contact portion has a greater cross-sectional area than the second commutator contact portion.

14. A brush assembly for an electronic motor having a commutator, the assembly comprising:
   a carbon based brush having a commutator contact surface and a castellation disposed opposite to the commutator contact surface, the contact surface being V-shaped to provide two lines of contact with the commutator at circumferentially spaced locations and having a transverse channel passing through an apex of the V-shaped contact surface and dividing the brush into a first commutator contact portion and a second commutator contact portion and having a guide hole extending radially from the transverse channel;
   a plate-like brush terminal having four brush spring mounting posts, a guide pin boss, a projection having an edge and forming an external motor terminal and barbs formed on the edge of the projection for mounting the brush terminal in an end cap of the motor;
   a brush spring formed from an elongated strip of resilient electrically conductive material and having two bifurcated ends and an intermediate portion, the two bifurcated ends being fixed to the brush terminal by the four brush spring mounting posts to form a loop and the intermediate portion has a brush mounting hole with edge flaps which grip and retain the castellation formed on the brush to mount the brush to the spring and a latching finger arranged to latch onto the brush terminal to hold the spring in a retracted position and extending from the intermediate portion; and
   a guide pin rigidly mounted at one end in the guide pin boss and extending in use towards the commutator and being received to form a sliding fit within the guide hole in the brush to guide the brush towards the commutator.

15. A brush assembly for an electric motor having a commutator, the assembly comprising:
   a brush;
   a brush terminal;
   a spring for urging the brush into contact with the commutator and electrically connecting the brush to the brush terminal, the spring having a first end and a second end, the first end and the second end of the spring being connected to the brush terminal; and
   a brush guide for guiding the brush to a desired position on the commutator.

16. The brush assembly of claim 15, wherein the brush has a guide hole formed therein and the brush guide comprises a guide pin received in the guide hole to form a sliding fit between the guide pin and the guide hole.

17. The brush assembly of claim 16, wherein the brush has a V-shaped base to form a first and a second brush contact leg for contacting the commutator, the guide pin being located between the first brush contact leg and the second brush contact leg.

18. The brush assembly of claim 17, wherein the V-shaped base of the brush forms a channel between the first and second brush contact legs and the guide pin extends into the channel.

19. A brush assembly for an electric motor having a commutator, the assembly comprising:
   a brush;
   a brush terminal;
   a spring for urging the brush into contact with the commutator and electrically connecting the brush to the brush terminal, the spring having a first end and a second end, the first end and the second end each having a slot formed therein to form a first bifurcated end and a second bifurcated end; and
   a brush guide for guiding the brush to a desired position on the commutator.

20. The brush assembly of claim 19, wherein the brush has a guide hole formed therein and the brush guide comprises a guide pin received in the guide hole to form a sliding fit between the guide pin and the guide hole.

21. A brush assembly for an electric motor having a commutator, the assembly comprising:

a brush having a guide hole formed therein;

a brush terminal;

a leaf spring for urging the brush into contact with the commutator and electrically connecting the brush to the brush terminal; and a guide member received in the guide hole for guiding the brush to a desired position on the commutator; wherein the leaf spring is connected to the brush in such a manner that the leaf spring will impart only a force that is substantially parallel to the guide hole.

22. The brush assembly of claim 17, wherein the V-shaped base of the brush has an uppermost surface and a lowermost surface, and the guide hole extends from the uppermost surface to the lowermost surface of the V-shaped base of the brush.

* * * * *